United States Patent [19]
DeMasters, III et al.

[11] Patent Number: 5,372,762
[45] Date of Patent: Dec. 13, 1994

[54] TIP AND DIE CENTERING METHOD

[75] Inventors: Charles DeMasters, III, Claremont; Bruce E. Townsend, Hickory, both of N.C.

[73] Assignee: Siecor Corporation, Hickory, N.C.

[21] Appl. No.: 77,267

[22] Filed: Jun. 17, 1993

[51] Int. Cl.$^5$ ............................................. B29C 47/28
[52] U.S. Cl. ...................................... 264/39; 264/174; 425/113; 425/190
[58] Field of Search .................. 264/39, 167, 174, 169; 425/466, 467, 468, 113, 114, 190

[56] References Cited

U.S. PATENT DOCUMENTS 3,780,484 12/1973 Muse .
4,871,492 10/1989 Spoetzl ................................. 264/39

FOREIGN PATENT DOCUMENTS 57-25919 2/1982 Japan ................................. 264/39

Primary Examiner—Mathieu D. Vargot
Attorney, Agent, or Firm—J. David Abernethy

[57] ABSTRACT

A method for centering a crosshead extrusion die to a tip by fixing the positions of the tip and die while a sizing probe is inserted into the tip and die.

2 Claims, 2 Drawing Sheets

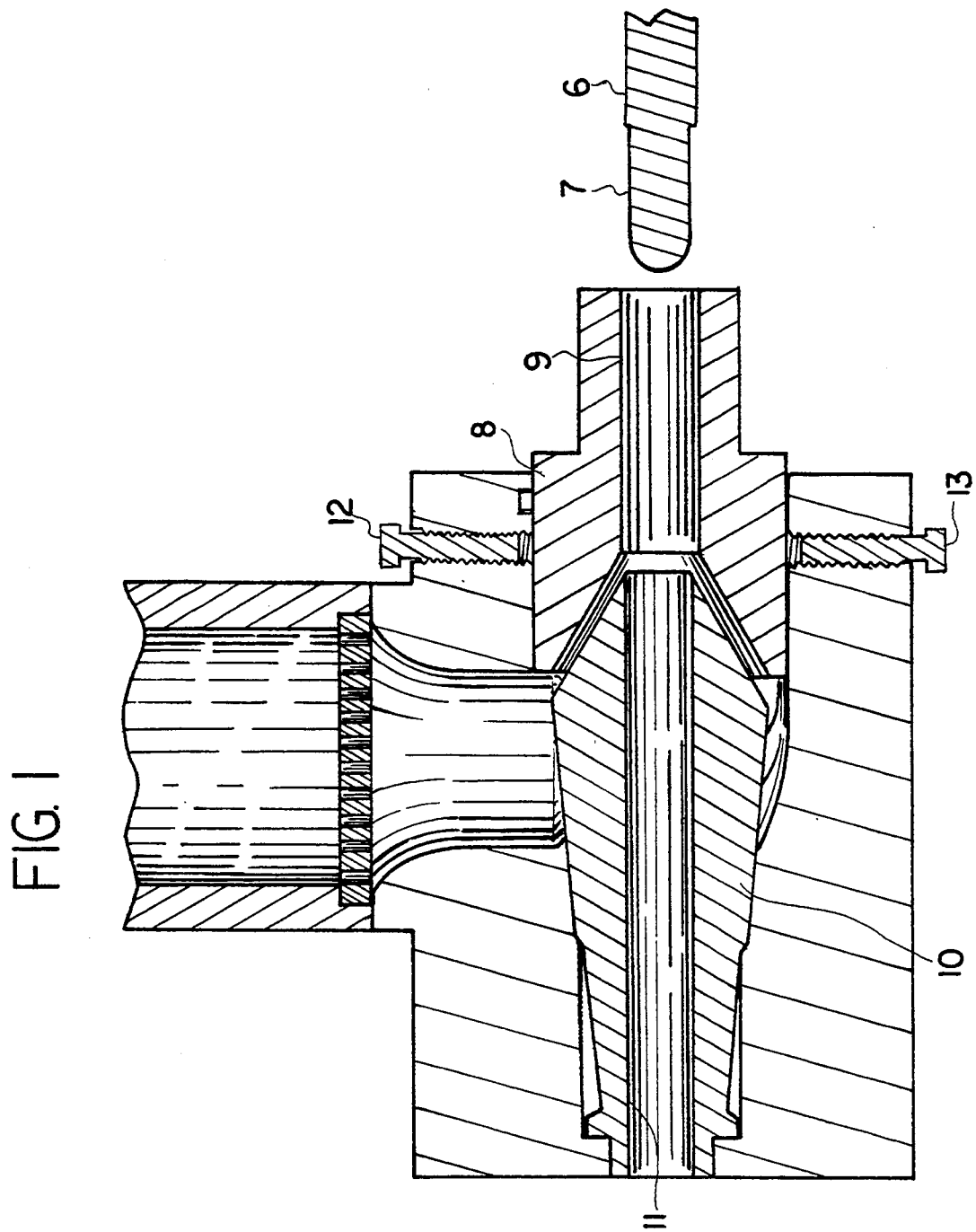
FIG. I

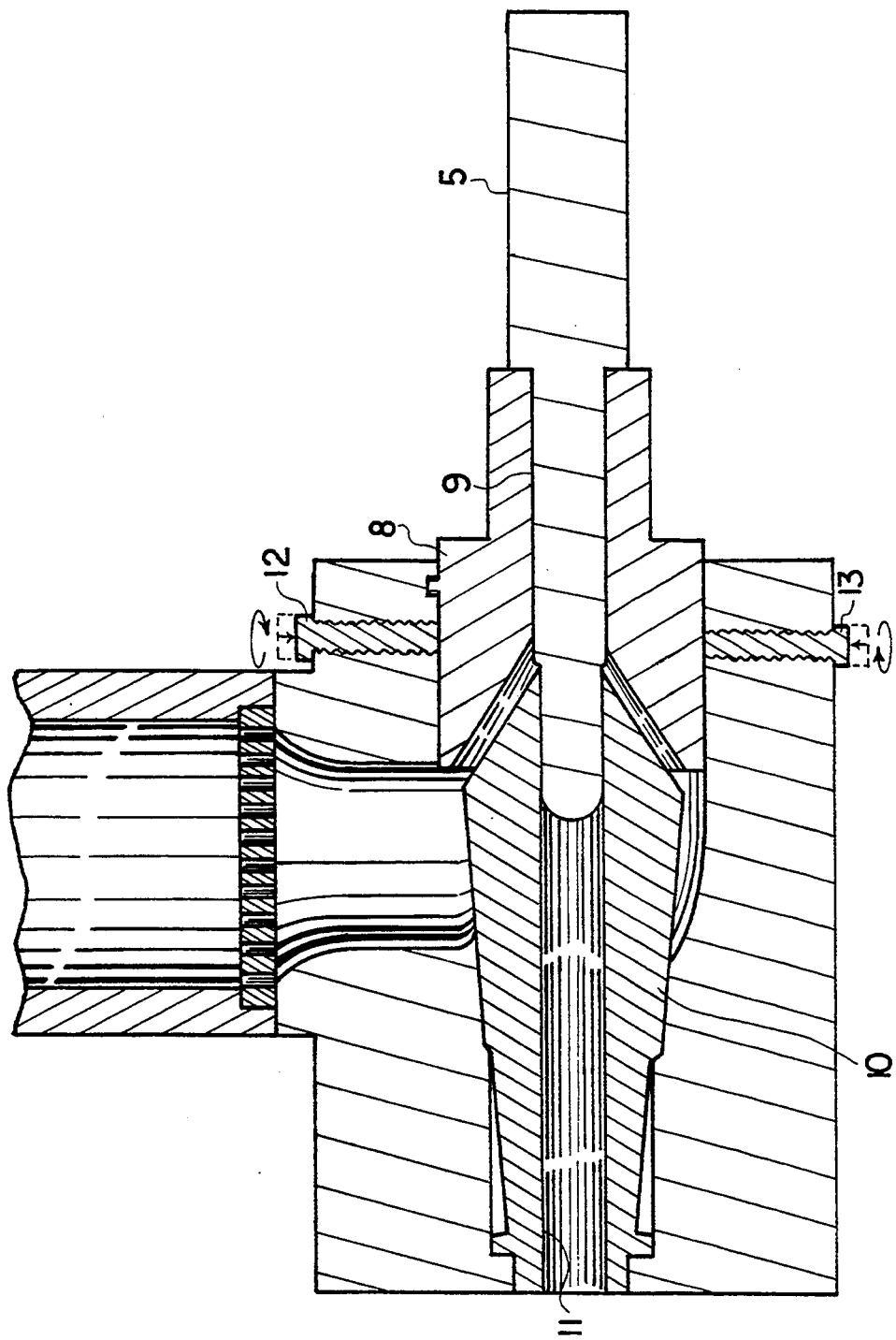

TIP AND DIE CENTERING METHOD

BACKGROUND OF THE INVENTION

The invention is in the field of methods for preparing crosshead extrusion tips and dies for melt extrusion.

Crosshead extrusion is the normal method for jacketing a communications element, such as copper wire or optical fiber, with plastic. A die has an internal bore through which the communications element is pulled. Plastic melt is introduced in the extrusion process around the tip and the communications element, the aggregate proceeding through the bore of a die which has an internal bore determining the external shape of the plastic jacket.

In order to obtain the maximum protection of the communications element by using the minimum amount of plastic melt, it is necessary to center the tip with respect to the die. Centering has formerly been accomplished by trial and error methods involving the extrusion of a cable sample which is then severed to examine the relative thickness of the jacket around various points on the periphery of the communications element. If the communications element is not centered properly, adjustments are made to rectify the situation.

While the former method above described is time consuming, it has also become more and more expensive in an era of cables having greater numbers and packing densities of communication elements per area of a cable cross-section. The number of communication elements that must be severed makes taking samples more expensive, and the precise tolerances required for bulk splicing of multifiber optical cables demands improved performance in the positioning of communication elements within tubes or ribbons.

Therefore, an object of the invention is to provide an improved crosshead extrusion set up process which can be carried out more quickly and with better results than previous methods.

SUMMARY OF THE INVENTION

The method according to the invention for centering a crosshead extrusion die having an internal bore of a first diameter to a tip adjacent to the die having an internal bore of a second diameter comprises providing a probe comprising a distal portion having an external diameter equal to the second diameter and a concentric mediate portion having an external diameter equal to the first diameter; inserting the distal portion of the probe into the bore of the tip and the mediate portion of the probe of the die; immobilizing the position of the die with respect to the tip while the probe is inserted; and removing the probe. In cases of cable elements having multiple communications elements or extrudate forming a non-circular cross section, such as fiber optic ribbons, the probe has a mediate portion whose external profile fits the internal bore of the die and a distal portion whose external profile fits the shape of an internal bore in the tip. The distal portion of the probe is inserted into at least one internal bore of the tip and the mediate portion is inserted into the bore of the die.

In each case, after the probe is inserted within the tip and die, the position of the die with respect to the is immobilized while the probe is inserted, and thereafter the probe is removed. The relative position of the bore of the tip and the bore of the die can be achieved by designing this relative position into the probe; making the mediate and distal portions of the probe concentric is an obvious example for concentric cables. In the case of fiber optic ribbons, the probe may have a plurality of distal portions fitting into a plurality of bores in the tip.

BRIEF DESCRIPTION OF THE FIGURES

The detailed description of the preferred embodiment is described with respect to the accompanying drawings, in which:

FIG. 1 is a sectional view of a crosshead extrusion tip and die prior to insertion of the probe; and, FIG. 2 is the view of FIG. 1 with the probe inserted into the bores of the tip and die.

DETAILED DESCRIPTION OF THE PREFERRED EMBODIMENT

A crosshead extrusion tip and die is shown in FIG. 1, including die 8 having an internal bore 9 of a first diameter, and a tip 10 having an internal bore 11 of a second diameter. A communications element proceeds through bore 11 and bore 9 and exits through the end of die 8. During the extrusion process, melt proceeds from an extruder around tip 10 forming an aggregate around the communications element which aggregate proceeds through bore 9 and exits the assembly.

A probe 5 is provided having a mediate portion 6 and a distal portion 7. The external shape of distal end 7 matches the internal shape of bore 11, and the external shape of mediate portion 6 matches the shape of bore 9. In the case where bore 11 and bore 9 each have circular transverse sections, mediate portion 6 and distal portion 7 are each shaped as rods, with the external diameter of mediate portion 6 being greater than the diameter of distal portion 7, mediate portion 6 and distal portion 7 being concentric. To center the extrusion apparatus, sizing probe 5 is inserted as shown in FIG. 2. Probe 5 is rotated while centering bolts 13, 12 are tightened to immobilize die 8 with respect to tip 10. If die 8 is not centered with respect to tip 10, probe 5 will not rotate and centering bolts 13, 12 will require readjustment. All centering bolts are tightened as probe 5 is rotated to a pressure of around five foot-pounds. Sizing probe 5 is then removed, leaving the extrusion assembly in a centered position. If the internal bores of die 8 and tip 10 are non-circular, then the appropriate portions of probe 5 would be non-circular as well.

It is desirable that probe 5 be of a material having a low thermal coefficient of expansion. Suitable probe materials include brass and ceramic materials.

What is claimed is:

1. A method for centering a crosshead extrusion die having an internal bore of a first diameter to a tip adjacent to the die having an internal bore of a second diameter which is smaller than the first diameter, comprising:
   (a) providing a probe comprising a distal portion having an external diameter equal to the second diameter and a concentric mediate portion having an external diameter equal to the first diameter;
   (b) inserting the distal portion of the probe into the bore of the tip and the mediate portion of the probe into the bore of the die and rotating the probe;
   (c) immobilizing the position of the die with respect to the tip while the probe is inserted and rotated; and,
   (d) removing the probe.

2. A method for centering a crosshead extrusion die having an internal bore of a first shape to a tip adjacent to the die having at least one internal bore of a second shape different from the first shape, comprising:
(a) providing a probe comprising a distal portion whose external profile fits the second shape and a mediate portion whose external profile fits the first shape;
(b) inserting the distal portion of the probe into an internal bore of the tip and the mediate portion of the probe into the bore of the die and rotating the probe;
(c) immobilizing the position of the die with respect to the tip while the probe is inserted and rotated; and,
(d) removing the probe.

* * * * *